United States Patent [19]
Jakobsson et al.

[11] Patent Number: 5,963,932
[45] Date of Patent: Oct. 5, 1999

[54] METHOD AND APPARATUS FOR TRANSFORMING QUERIES

[75] Inventors: Hakan Jakobsson, San Francisco; Michael Depledge, San Jose; Jeffrey I. Cohen, Sunnyvale; Cetin Ozbutun, San Carlos, all of Calif.

[73] Assignee: Oracle Corporation, Redwood Shores, Calif.

[21] Appl. No.: 08/846,520

[22] Filed: Apr. 29, 1997

[51] Int. Cl.⁶ .................................................. G06F 17/30
[52] U.S. Cl. ................................ 707/2; 707/3; 395/708; 395/709
[58] Field of Search .................................. 707/1, 2, 3, 4, 707/100–104; 395/707–709

[56] References Cited

U.S. PATENT DOCUMENTS

| | | | |
|---|---|---|---|
| 5,301,317 | 4/1994 | Lohman et al. | 707/2 |
| 5,590,319 | 12/1996 | Cohen et al. | 707/4 |
| 5,724,570 | 3/1998 | Zeller et al. | 707/3 |
| 5,742,806 | 4/1998 | Reiner et al. | 707/3 |
| 5,761,494 | 11/1996 | Smedley et al. | 707/2 |

*Primary Examiner*—Thomas G. Black
*Assistant Examiner*—Hosain T. Alam
*Attorney, Agent, or Firm*—McDermott, Will & Emery

[57] ABSTRACT

In processing a query, a database server parses a string describing a query into a query representation. The query string is parsed again to generate a replica of the query representation. Various transformations can be applied to the replica in order to reduce the amount of processing for the query. In addition, transformations are applied to the query string before parsing again to produce a transformed query representation. A transformed query representation is selected for processing a query according to an estimated cost of using the query representation.

22 Claims, 7 Drawing Sheets

METHOD AND APPARATUS FOR TRANSFORMING QUERIES

FIELD OF THE INVENTION

The present invention relates to computer database systems and more particularly to processing database queries.

BACKGROUND OF THE INVENTION

Relational databases store information in indexed tables. A user retrieves information from the tables by entering input that is converted to queries by a database application. The database application submits the queries to a database server. In response to a query, the database server accesses the table specified in the query to determine which information within the tables satisfies the queries. The information that satisfies the queries is then retrieved by the database server and transmitted to the data application, and ultimately to the user.

For any given database server, the queries must conform to the rules of a particular query language. Most query languages provide users with a variety of ways to specify information to be retrieved. For example, in the Structured Query Language (SQL), the following query requests the retrieval of the information contained in all rows of table T1:

```
[QUERY 1]
SELECT*FROM T1
```

In executing a query, the database server receives the query as a string and converts the query string into a complex, internal structure, which is manipulated during the execution of the query. The process of converting a query string into an internal representation of a query is called parsing. Parsing involves checking that the query string conforms to the syntax of the query language and that the query string is semantically meaningful with respect to the objects (tables, columns, etc.) involved and their data types. During this process, an internal representation of the query is generated that includes the structure of the query, various internal structures used for bookkeeping during the different stages of parsing, and structures that hold information that is needed in later phases of the processing of the query. For instance, information about indexes on tables referenced in a query may be retrieved from the data dictionary of the database to be used for a later query transformation or optimization phase.

Thus, a database server may parse QUERY 1 into an internal structure represented as a parse tree in FIG. 1(*a*). Node 100 is the base of the parse tree and the head of the SELECT clause with node 102 as the argument. Node 110 is the base of the FROM clause with node 112 as the argument.

A query transformation is a modification of a query into another query that is structurally different but semantically equivalent in the sense of returning the same result. Relation databases systems often perform various types of query transformations with the goal of generating a transformed query that can be executed more efficiently than the original query. Such transformations may involve converting subqueries into joins, merging views so that a reference to a view is replaced with the definition of the view, etc. Some query transformations may involve adding additional table references or subqueries to a query, giving rise to the problem being addressed, namely, the generation of internal representation for the additional query constructs that were not part of the original query.

For example, U.S. patent application Ser. No. 08/808,621, entitled "Method for Executing Star Queries," filed by Hakan Jakobsson, Cetin Ozbutun, and William H. Waddington on Feb. 28, 1997, now U.S. Pat. No. 5,848,408 discloses "star transformation" techniques for transforming the internal structure of a star query.

For example, [QUERY 2] is a star query:

```
[QUERY 2]
SELECT*FROM FACT,DIM1,DIM2 WHERE
    FACT.COL1 = DIM1.COL1
AND FACT.COL2 = DIM2.COL1
AND DIM1.COL2 = 5 AND DIM2.COL2 = 100
```

The internal structure for QUERY 2 is represented in FIG. 1(*b*). Node 100 is the base of the start query, a SELECT clause, node 110 is the base of the FROM clause, and node 120 is the base of the WHERE clause. Each node in the internal structure represents information for the query. Thus, node 100 has one argument, node 102, stating which columns are to be selected. The FROM clause at node 110 has three arguments, nodes 114–118, stating upon which tables the query is executed. Finally, the predicate tree at AND node 122 is the argument to WHERE clause at node 120. There are four simple predicates in the predicate tree at nodes 130, 140, 150, and 160 corresponding to the predicates of the query. Each simple predicate is a tree containing a relation and arguments. For example, predicate at node 130 comprises an equality relation at node 130 and two arguments, nodes 132–134 and 136–138. Similarly, nodes 142–148, 152–156, and 162–166 are arguments for the respective relations.

Applying a star transformation technique to the internal structure of QUERY 2, represented in FIG. 1(*b*), yields a transformed internal structure represented in FIG. 2. Referring to FIG. 2, the transformed internal structure contains two additional clauses, starting at nodes 210 and 250 respectively in box 200, joined to AND node 122. The transformed internal structure corresponds to the following query:

```
[QUERY 3]
SELECT*FROM FACT,DIM1,DIM2 WHERE
    FACT.COL1 = DIM1.COL1
AND FACT.COL2 = DIM2.COL1
AND DIM1.COL2 = 5 AND DIM2.COL2 = 100
AND FACT.COL1 IN
    (SELECT COL1 FROM DIM1 WHERE COL2 = 5)
AND FACT.COL2 IN
    (SELECT COL1 FROM DIM2 WHERE COL2 = 100)
```

The last two clauses serve to reduce the amount of processing the database server would have to perform by limiting the number of rows the database server has to retrieve from the fact table. Therefore, a star transformation requires the internal representation of the additional clauses to be appended to the original query.

In an environment where a relational database server is subject to further development by adding new features and capabilities, the internal representation of a query is also likely to change and grow. New features are likely to require new internal representations as well as associated structures for the additional bookkeeping during parsing and for processing queries where the new features may be involved. If new features are being added by different groups of program developers in a decentralized fashion, having multiple code paths for generating the internal representation of a query can result in code inconsistencies if not all code paths are properly updated to reflect the new features.

The risk of such inconsistencies is a very real one if a group of developers are adding a new feature while a different group is adding a new query transformation that generates a new internal representation. If the two groups are not sufficiently aware of the hidden interaction between their two projects, the new code paths may not correctly generate the new internal representation. Moreover, having multiple code paths results in additional code maintenance costs because every code path for generating the internal representation of a query must be updated for each new feature. Therefore, there is a need for reducing the number of code paths for the generating the internal representation of a query, by the parser, query transformation modules, and any other component of the database system.

Moreover, some transformations are not always beneficial, depending on the query being invoked. A particular transformation technique may improve performance for some queries but impair performance for other queries. In order to ascertain whether executing a query will benefit from a particular transformation, an estimate for the cost of executing the original query is made. Then the original query is transformed, and a cost estimate for the transformed query is computed. In this manner, transformations that do not improve performance can be detected and rejected. A query transformation is a destructive operation in that the structure of the query is changed, and a mechanism for undoing a rejected transformation is cumbersome, if not impossible. Therefore, there is a need to avoid having to provide an undo mechanism.

SUMMARY OF THE INVENTION

In accordance with one aspect of the invention, a method for processing a query, described by an original query string, comprises the steps of parsing the original query string into a first query representation. The original query string is parsed again to create a second query representation, separate from the first query representation. A third query representation is generated from the first query representation and the second query and used to process the original query.

In another aspect of the invention, the second query representation is transformed, and the transformed second query representation is used to generate the third query representation. In another aspect, a cost is determined for the first query representation and the transformed query representation. The query representation with the lower cost is the query representation used to process a query.

In accordance with another aspect of the invention, a method for processing a query, described by an original query string, comprises the step of parsing the original query string into a first query representation. A transformation is applied to the original query string, resulting in a second query string. The second query string is parsed to create the second query representation. A third query representation is generated from the first query representation and the second query and used to process the original query.

Accordingly, the various aspects of the invention employ a single code path for generating the internal representation of a query. This code path is the code path that is normally followed when a query is parsed, which starts with a text representation of a query string and generates the internal representation of the query as the result. Moreover, by generating different copies of a query representation during a cost-based query transformation, the problem of undoing a rejected transformation is avoided.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method for processing a query, described by a query string, in a database system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

PRODUCING A REPLICA OF A QUERY STRUCTURE

Figure 1A:
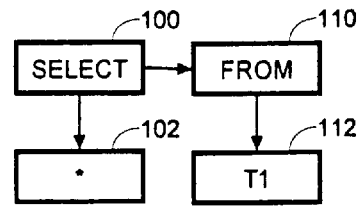
FIGS. 1(a) and 1(b) are block diagrams showing an internal representation of a query structure.
Figure 1B:
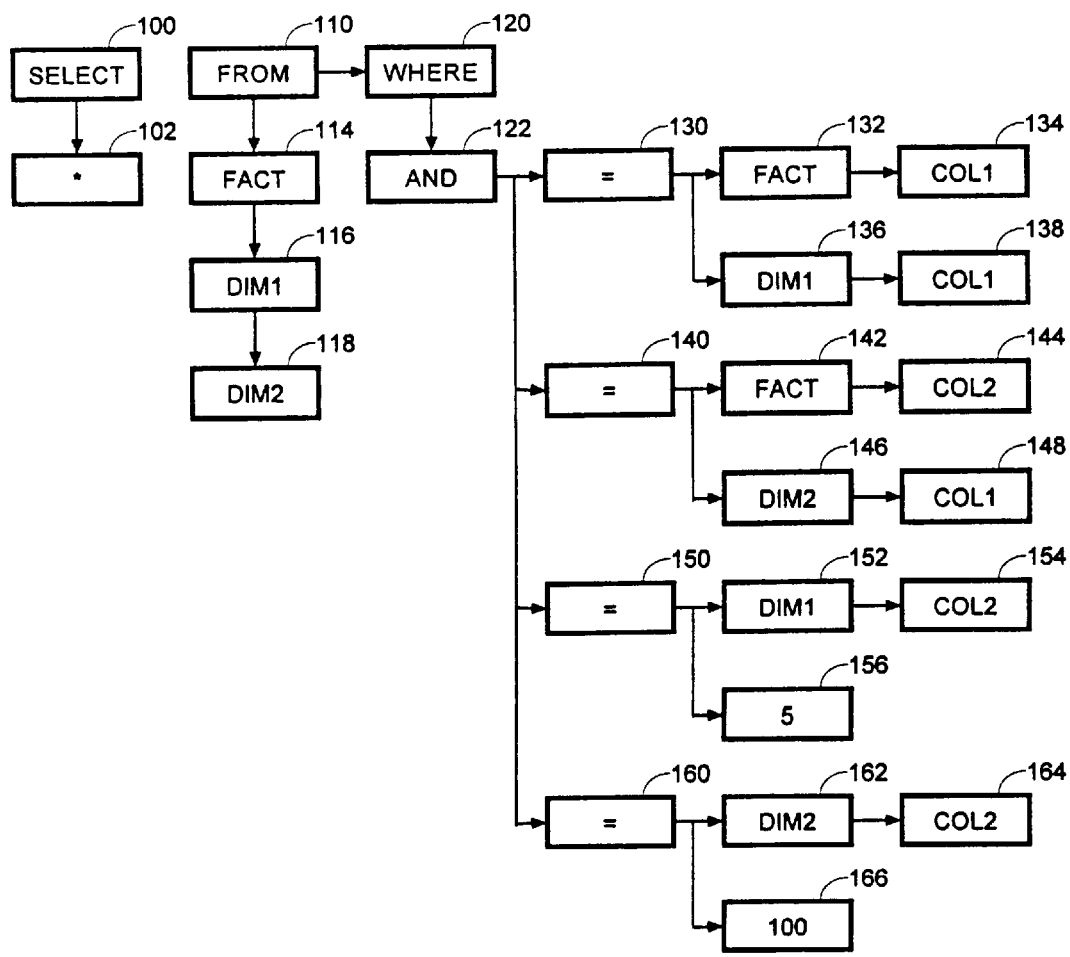
Figure 2:
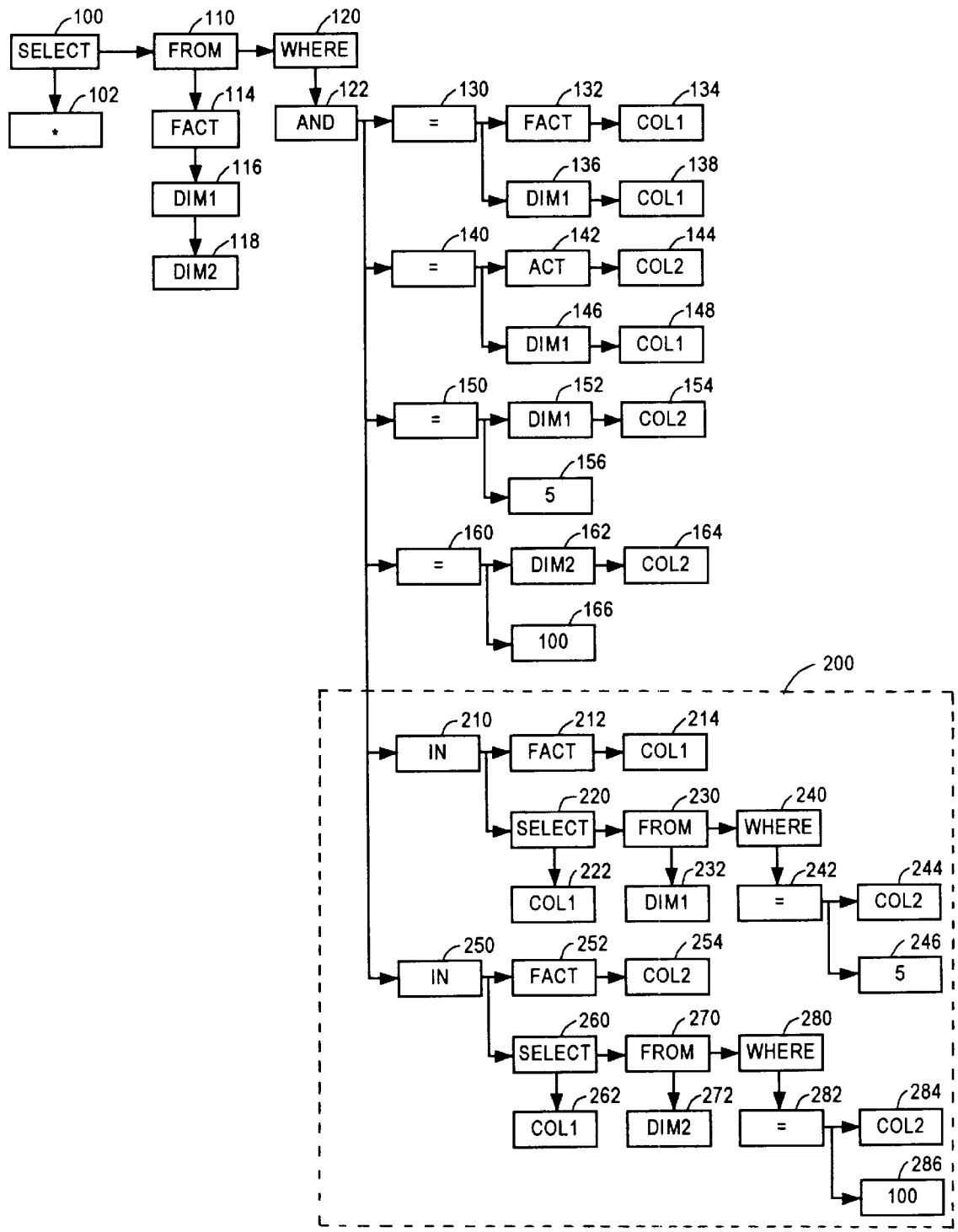
FIG. 2 is a block diagram showing an internal representation of a modified query structure.
Figure 3:
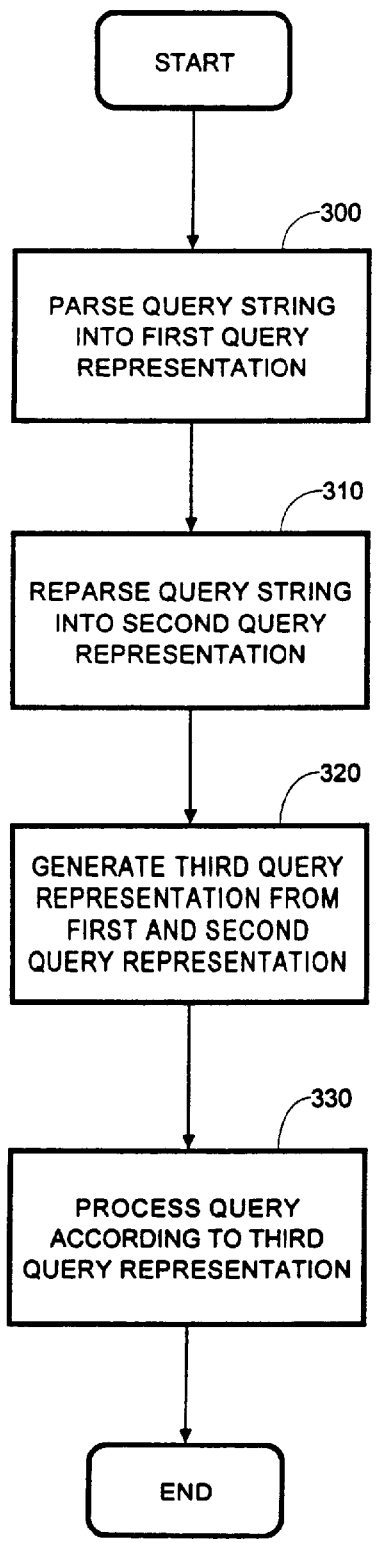
FIG. 3 is a flowchart depicting an operation of processing a query according to an embodiment of the invention.

According to an embodiment of the invention, a replica of a query structure is produced not by copying the query structure but by calling the parser for a second time over the query string. Referring to FIG. 3, step 300 parses the query string into a first query representation. Step 310 parses the query string into a separate, second query representation, creating a replica of the first query representation. After the two query representations have been generated, a third query representation is produced from the two query representations (step 320), and used for processing the query (step 330).

In this manner, no additional instructions to copy the internal representation of the query and patch the various pointers need to be written, because the parser already has that capability within itself. In addition, new features added to the internal representation need only be added in one place, the parser, reducing the possibility for inconsistent modifications to the source code during the development process.

COST-BASED QUERY TRANSFORMATIONS

Figure 4:
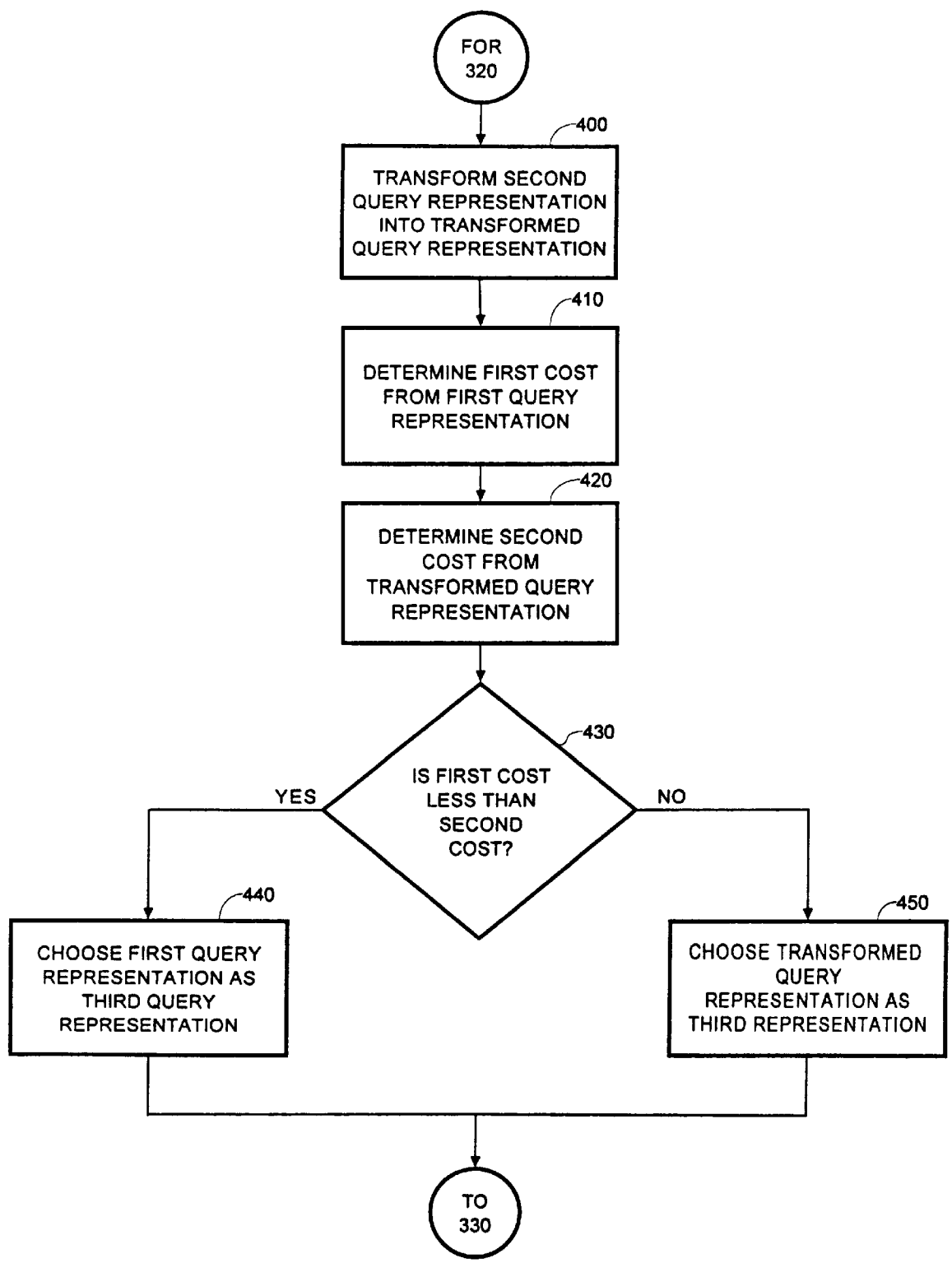
FIG. 4 is a flowchart depicting an operation of a cost-based query transformation according to an embodiment of the invention.

An aspect of the operation of a cost-based query transformation according to an embodiment of the invention is shown in FIG. 4. Step 400 is executed after a second query representation was produced in step 310 by reparsing the original query string. Step 400 transforms the second query representation into a transformed query representation, according to a transformation that has the potential to improve the performance of processing the query. An embodiment uses some query transformation mechanism, but not any particular query transformation mechanism. Various transformations are known in the art, and one transformation, star transformation, is described above.

Steps 410 and 420 determine, respectively, a first and second cost for the first query representation and the transformed query representation. An embodiment of the invention requires the use of some cost metric for estimating the performance characteristics of using a query representation, but not any particular mechanism. A wide variety of techniques are known in the art and described in the literature. According to one embodiment, the cost is determined by how much data would possibly be read from non-volatile storage, such as a hard disk. Other embodiments may consider the amount of computing resources used by a central processing unit, the costs of network traffic, or a combination of such and similar costs.

After the first and second costs have been determined, step 430 compares the two costs. If the first cost, corresponding to the first query representation generated from the original query string, is less than the second cost, then the first query representation is established as the query representation to be used for processing the query (step 440). On the other hand, if the second cost, corresponding to the transformed query representation, is less than the first cost, then the transformed query representation is established as the query representation used in processing the query (step 450). In establishing one query representation for processing the query, the other query representation is discarded.

In this manner, if the transformed query representation costs more than the first query representation, the transformed query representation can simply be discarded. Since the transformation was performed on a replica of the first query representation, the first query was not modified by the cost-based query transformation framework and is thus available for immediate use as the query representation for processing the query. As a result, the transformations applied to a query representation need not be undone, but simply discarded.

Figure 5:
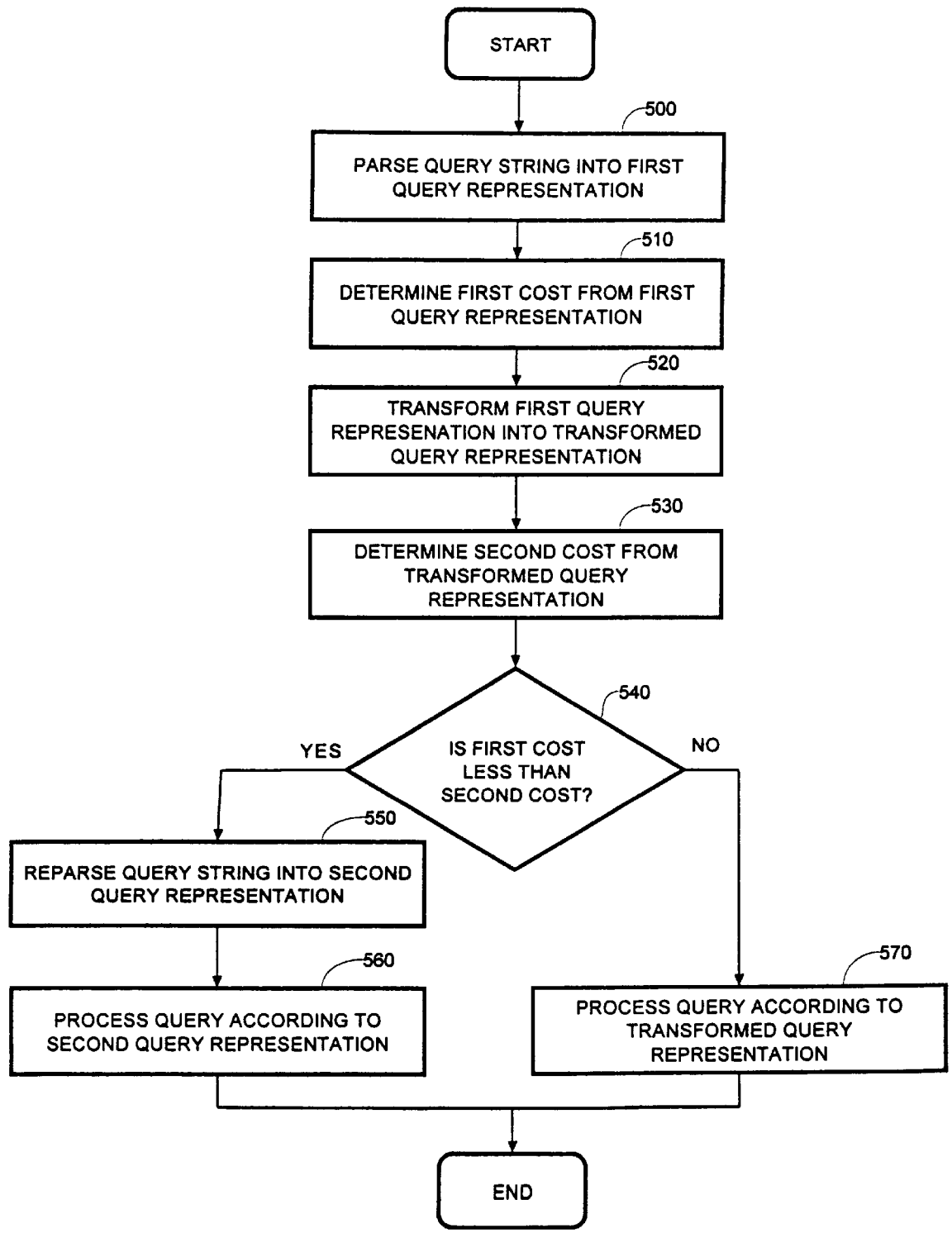
FIG. 5 is a flowchart depicting an operation of a cost-based query transformation according to another embodiment of the invention.

In another embodiment, the number of active query representations is reduced by reparsing the original query string only when necessary. Referring to FIG. 5, the original query string is parsed into a first query representation (step 500) and a first cost is determined for that query representation (step 510). Proceeding to step 520, the first query representation is transformed into a transformed query representation, and in step 530 a second cost is determined for the transformed query representation.

Step 540 compares the first cost and second cost. If the first cost is less than the second cost, then the transformed query representation is freed up, and the original query string is reparsed into a second query representation (step 550), which is used to process the query (step 560). On the other hand, if the second cost is less than the first cost, then the transformed query representation is used to process the query (step 570). By deferring the reparsing of the original query string only until necessary, the memory usage in producing a query representation for use in processing a query is accordingly reduced.

PERFORMING A STAR QUERY TRANSFORMATION

Figure 6:
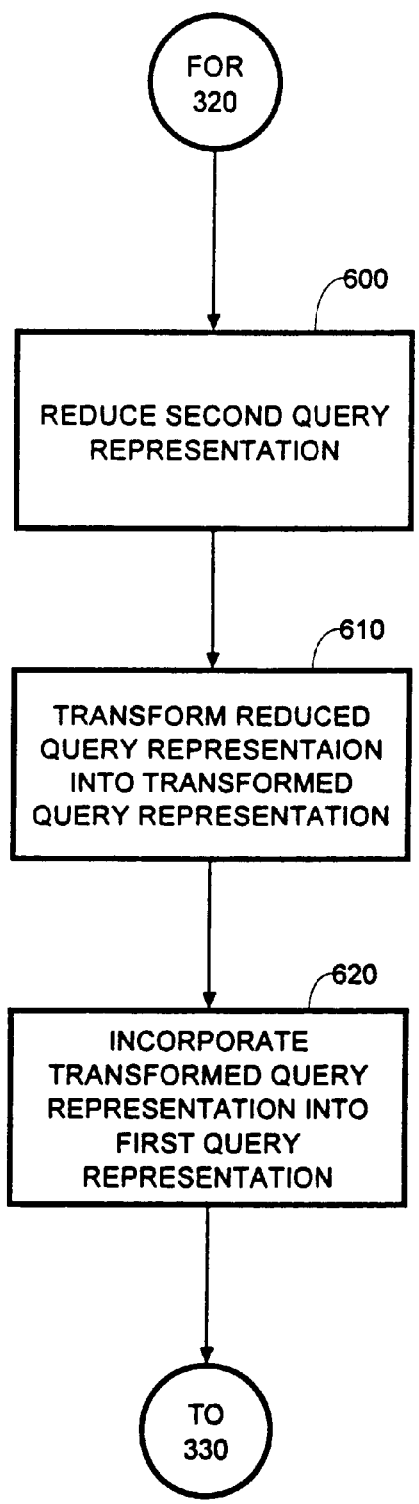
FIG. 6 is a flowchart depicting an operation of a star transformation according to an embodiment of the invention.

FIG. 6 shows a flowchart depicting a star query transformation according to an embodiment of the invention. After the parser was invoked to produce a second query representation, as a replica of the first query representation (step 310), a dimension table from the query is chosen, and predicates not referring to the dimension table are removed from the second query representation (step 600). Then the resulting, reduced query representation is transformed into a transformed query representation (step 610) and incorporated into the first query representation (step 620).

This process is repeated for other dimension tables referenced by the query. For example, if there is a second dimension table, the query string is parsed for a third time and the resulting query representation is reduced, transformed, and incorporated into the first query representation. In this manner, several replicas of the original query representation can be generated even though the first query representation has been modified, yielding additional flexibility in applying a star transformation.

TRANSFORMING A QUERY STRING

Figure 7:
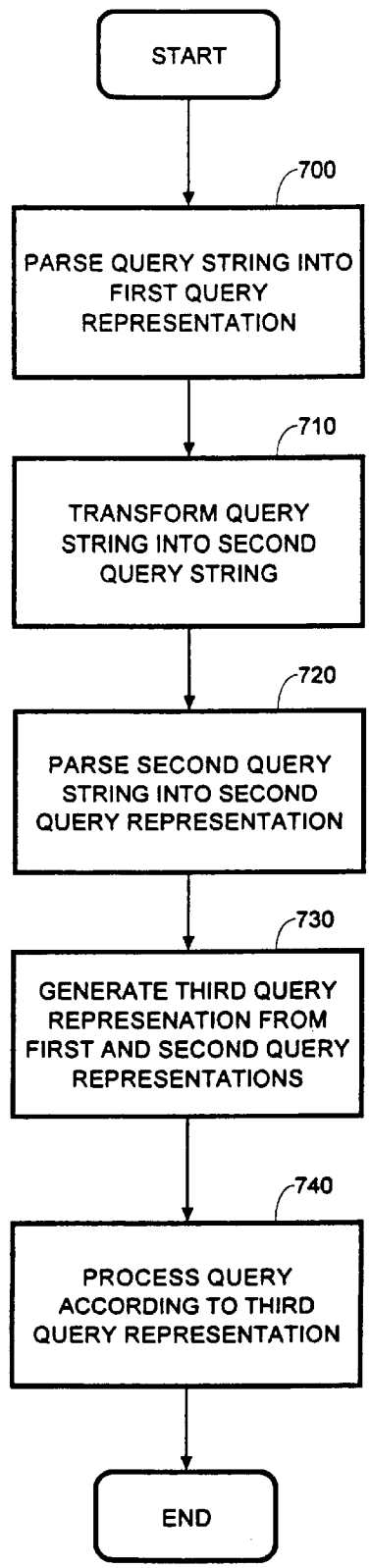
FIG. 7 is a flowchart depicting an operation of processing a query according to another embodiment of the invention.

According to another embodiment of the invention, a transformation is applied to the query string before invoking the parser a second time. Referring to FIG. 7, after the first query string is parsed to produce a first query representation (step 700), the first query string is transformed into a second query string (step 710). In one embodiment, a copy of the string is made during the transformation of the query string. Copying strings is well known in the art and much easier than copying an internal query representation, because strings are simple data representations and do not contain internal pointers.

After the second query string is produced, the second query string is parsed into a second query representation (step 720). The first and second query representations are used to generate a third query representation, as described above, (step 730), and the third query representation is used to process the query (step 740).

In another embodiment, the original query string is transformed by appending a string to a copy of the original query string. For example, a star transformation normally adds additional predicates to a query. A string representing these additional predicates can be generated directly and appended to the copy of the query string.

In another embodiment, the original query string is transformed by extracting a substring. Extracting a substring from a string is well known in the art, and may be accomplished by copying out the substring or by employing two external string pointers, one pointer pointing to the beginning of the substring and the other pointer pointing to the end.

In yet another embodiment, transforming the original query string into the second query string involves generating from scratch the second query string from information found in the original query string or the first query representation.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for processing a query, described by an original query string, in a database system, comprising the steps of:

parsing the original query string to produce a first query representation;

parsing the original query string to produce a second query representation,
   wherein the first query representation and the second query representation are separate copies of one another; and transforming the second query representation to produce a transformed query representation.

2. The method of claim 1, wherein the step of transforming the second query representation to produce a transformed query representation further comprises the steps of:

removing parts of the second query representation to produce a reduced query representation; and transforming the reduced query representation to produce the transformed query representation.

3. The method of claim 1, further comprising the steps of:

generating a third query representation based upon the first query representation and the transformed query representation; and processing the query according to the third query representation.

4. The method of claim 3, wherein the step of generating a third query representation based on the first query representation and the transformed query representation includes the step of inserting parts of the transformed query representation into the first query representation to produce the third query representation.

5. The method of claim 3, wherein the step of generating a third query representation based upon the first query representation and the transformed query representation includes the steps of:

determining a first query cost from the first query representation;

determining a second query cost from the transformed query representation;

comparing the first query cost and the second query cost;

if the second query cost is less than the first query cost, then establishing the transformed query representation as the third query representation; and if the first query cost is less than the second query cost, then establishing the first query representation as the third query representation.

6. A method for processing a query, described by an original query string, in a database system, comprising the steps of:

parsing the original query string to produce a first query representation;

determining a first query cost from the first query representation;

transforming the first query representation to produce a transformed query representation;

determining a second query cost from the transformed query representation;

comparing the first query cost and the second query cost;

if said comparing indicates that the second query cost is less than the first query cost, then processing the query according to the transformed query representation; and if said comparing indicates that the first query cost is less than the second query cost, then performing the steps of:

reparsing the original query string to produce a second query representation; and processing the query according to the second query representation.

7. A method for processing a query, described by an original query string, in a database system, comprising the computer-implemented steps of:

parsing the original query string to produce a first query representation;

transforming the original query string to produce a second query string;

parsing the second query string to produce a second query representation, separate from the first query representation;

generating a third query representation based upon the first query representation and the second query representation; and processing the query according to the third query representation.

8. The method of claim 7, wherein the step of transforming the original query string to produce a second query string further comprises the step of extracting a substring from the original query string as the second query string.

9. The method of claim 7, wherein the step of transforming the original query string to produce a second query string further comprises the step of appending a string to the original query string.

10. The method of claim 7, wherein the step of transforming the original query string to produce a second query string further comprises the step of generating directly the second query string based on information found in the original query string.

11. The method of claim 7, wherein the step of generating a third query representation based upon the first query representation and the second query representation includes the steps of:

determining a first query cost from the first query representation;

determining a second query cost from the second query representation;

comparing the first query cost and the second query cost;

if the first query cost is less than the second query cost, then establishing the first query representation as the third query representation; and if the second query cost is less than the first query cost, then establishing the second query representation as the third query representation.

12. A computer readable medium having stored thereon sequences of instructions for processing a query, described by an original query string, in a database system, said sequences of instructions including instructions for performing the steps of:

parsing the original query string to produce a first query representation;

parsing the original query string to produce a second query representation,
    wherein the first query representation and the second query representation are separate copies of one another; and transforming the second query representation to produce a transformed query representation.

13. The computer readable medium of claim 12, wherein the step of transforming the second query representation to produce a transformed query representation further comprises the steps of:

removing parts of the second query representation to produce a reduced query representation; and transforming the reduced query representation to produce the transformed query representation.

14. The computer-readable medium of claim 12, wherein said instruction further include instructions for performing the steps of:

generating a third query representation based upon the first query representation and the transformed query representation; and processing the query according to the third query representation.

15. The computer readable medium of claim 14, wherein the step of generating a third query representation based on the first query representation and the transformed query representation includes the steps of inserting parts of the transformed query representation into the first query representation to produce the third query representation.

16. The computer readable medium of claim 14, wherein the step of generating a third query representation based upon the first query representation and the transformed query representation further comprises the steps of:

determining a first query cost from the first query representation;

determining a second query cost from the transformed query representation;

comparing the first query cost and the second query cost;

if the first query cost is less than the second query cost, then establishing the first query representation as the third query representation; and if the second query cost is less than the first query cost, then establishing the transformed query representation as the third query representation.

17. A computer readable medium having stored thereon sequences of instructions for processing a query, described by an original query string, in a database system, said sequences of instructions including instructions for performing the steps of:

parsing the original query string to produce a first query representation;

determining a first query cost from the first query representation;

transforming the original query string to produce a transformed query representation;

determining a second query cost from the transformed query representation;

comparing the first query cost and the second query cost;

if said comparing indicates that the second query cost is less than the first query cost, then processing the query according to the transformed query representation; and if said comparing indicates that the first query cost is less than the second query cost, then performing the steps of:

reparsing the original query string to produce a second query representation; and processing the query according to the second query representation.

18. A computer readable medium having stored thereon sequences of instructions for processing a query, described by an original query string, in a database system, said instructions including instructions for performing the steps of:

parsing the original query string to produce a first query representation;

transforming the original query string to produce a second query string;

parsing the second query string to produce a second query representation, separate from the first query representation;

generating a third query representation based upon the first query representation and the second query representation; and processing the query according to the third query representation.

19. The computer readable medium of claim 17, wherein the step of transforming the original query string to produce a second query string further comprises the step of extracting a substring from the original query string as the second query string.

20. The computer readable medium of claim 17, wherein the step of transforming the original query string to produce a second query string further comprises the step of appending a string to the original query string.

21. The computer readable medium of claim 17, wherein the step of transforming the original query string to produce a second query string further comprises the step of generating directly the second query string based on information found in the original query string.

22. The computer readable medium of claim 18, wherein the step of producing a third query representation based upon the first query representation and the second query representation further comprises the steps of:

determining a first query cost from the first query representation;

determining a second query cost from the second query representation;

comparing the first query cost and the second query cost;

if the first query cost is less than the second query cost, then establishing the first query representation as the third query representation; and if the second query cost is less than the first query cost, then establishing the second query representation as the third query representation.

* * * * *